United States Patent [19]

Harper

[11] Patent Number: 4,750,198

[45] Date of Patent: Jun. 7, 1988

[54] CELLULAR RADIOTELEPHONE SYSTEM PROVIDING DIVERSE SEPARATELY-ACCESSIBLE GROUPS OF CHANNELS

[75] Inventor: Donald J. Harper, Altamonte Springs, Fla.

[73] Assignee: Astronet Corporation/Plessey U.K., Lake Mary, Fla.

[21] Appl. No.: 940,565

[22] Filed: Dec. 12, 1986

[51] Int. Cl.⁴ .............................................. H04B 1/00
[52] U.S. Cl. ....................................... 379/59; 379/63; 455/33
[58] Field of Search ....................... 379/56, 57, 58, 59, 379/60, 61, 63; 455/33, 34, 54

[56] References Cited

U.S. PATENT DOCUMENTS

| | | | |
|---|---|---|---|
| 3,913,017 | 10/1975 | Imaseki | 379/59 |
| 4,163,121 | 7/1979 | Yoshikawa et al. | 379/59 |
| 4,427,980 | 1/1984 | Ferrell et al. | 340/825.52 |
| 4,434,506 | 2/1984 | Fujiwara et al. | 455/53 |
| 4,534,061 | 8/1985 | Ulug | 455/17 |
| 4,600,922 | 7/1986 | Dunkerton et al. | 340/825.44 |
| 4,628,152 | 12/1986 | Åkerberg | 379/51 |
| 4,633,509 | 12/1986 | Scheinert | 455/33 |
| 4,638,479 | 12/1986 | Alexis | 370/95 |
| 4,646,345 | 2/1987 | Zourek et al. | 379/62 |

Primary Examiner—Robert Lev
Attorney, Agent, or Firm—Cesari and McKenna

[57] ABSTRACT

A cellular radiotelephone system including plurality of channels with a mechanism for dividing the channels into two diverse sets based on a division of the control channels used to transmit control information. The division is effected by providing that one group of subscriber sets begins scanning the control channels at the first control channel and only scans up to a maximum number of control channels, and a second group of subscriber sets begins scanning at another control channel not scanned by the first group.

1 Claim, 16 Drawing Sheets

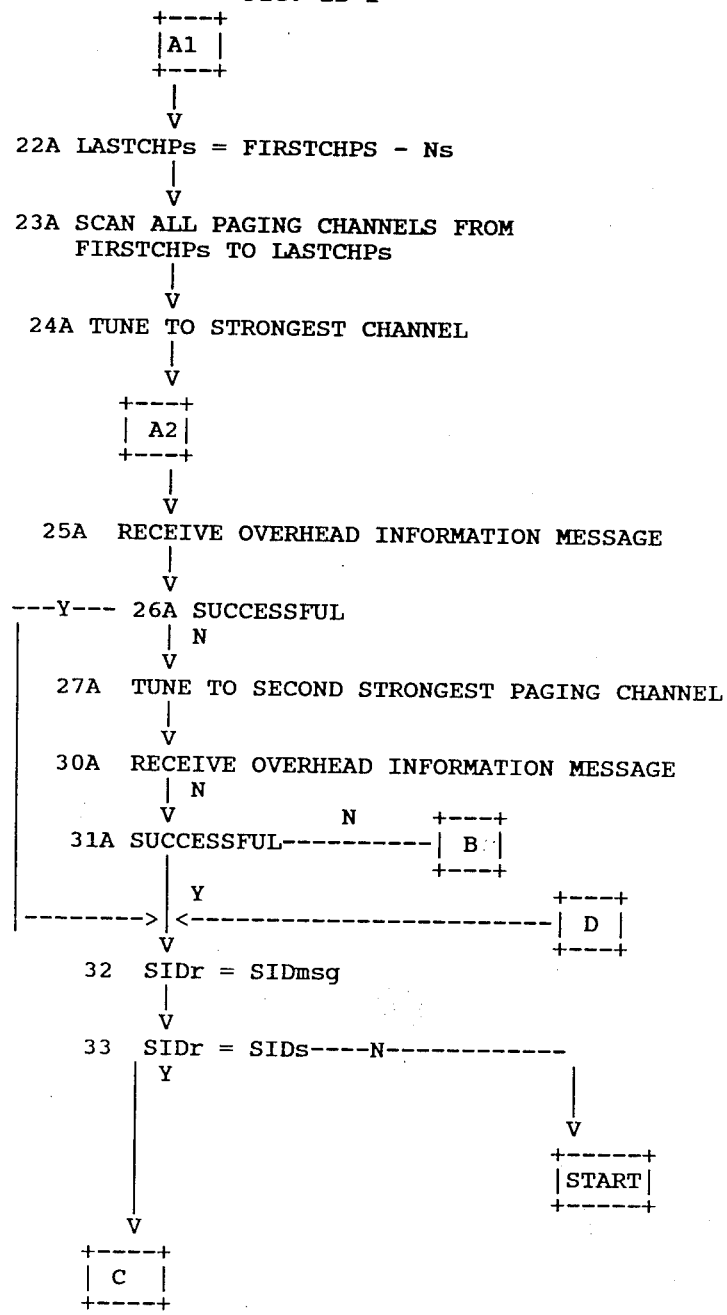

CELLULAR RADIOTELEPHONE SYSTEM PROVIDING DIVERSE SEPARATELY-ACCESSIBLE GROUPS OF CHANNELS

BACKGROUND OF THE INVENTION

1. Field of the Invention

The invention relates generally to the field of cellular radiotelephone systems, and more specifically provides a new mechanism for dividing cellular radiotelephone channels into diverse groups.

2. Description of the Prior Art

Cellular radiotelephone systems have recently been introduced in a number of areas to provide telephone coverage for people who need to have access to telephones from outside of their offices or are otherwise unable to get to telephones that are directly connected to a central office over conventional telephone lines.

In cellular radiotelephone systems, an area is divided into a plurality of small regions, or "cells", each of which is covered by a relatively low-power transmitter. Currently, cellular radiotelephone service is provided in the 825 to 845 Mhz and 870 to 890 Mhz frequency bands. The higher-frequency band is used for "down-link" transmissions from the "cell site" for reception by the subscriber. The cell site is the location of the transmitter, or, more specifically, the location of the antenna from which transmissions are effected for the cell. The lower frequency band is used for "up-link" transmissions from the subscriber in the cell for reception by the receiving equipment which is also located at the cell site.

Each frequency band assigned to the cellular radiotelephone system is divided into two groups, with one group being reserved for the local telephone company and the other group being franchised to a completing service provider. Each cellular channel has a thirty kilohertz bandwidth, allowing for 666 sequentially numbered channels, with channels 1 through 333 being allocated to one service provider and channels 334 through 666 being allocated to the other service provider.

Currently, all channels in a group are available to all subscribers. Under some circumstances, however, it may be desirable to allocate at least some cellular channels to specific users and to ensure that other subscribers not have access to those channels. For example, some commercial customers may wish to use cellular telephone services in their communications and have allocated to them certain of the cellular channels. In addition, it may be desirable to allocate, for at least a brief time while a cellular system is being set up or modified, a set of channels for use by the installation or repair services.

SUMMARY OF THE INVENTION

The invention permits a group of cellular channels to be divided into two subgroups based on a division of paging and access control channels which control access by the subscribers to the cellular system without requiring a modification of the sequency of steps performed by the subscriber sets in obtaining access to the cellular system.

Normally, a subscriber set, when it is first turned on or it enters a new cell, attempts to receive and synchronize to a new paging and access control channel. In doing so, it scans through the group's set of paging and access control channels and attempts to synchronize to the signal in the strongest channel. In that scan the subscriber set receives a value. The subscriber set then performs a second scan, scanning through the number of channels corresponding to the value received during the first scan. The subscriber set begins the second scan on a channel as determined by its control circuitry. By having the control circuitry in one subgroup of subscriber sets begin the second scan on the first channel, and the second subgroup of subscriber sets begin their second scan on another channel which is not scanned by the first subgroup during the second scan, the control of the channel group can be divided into two subgroups. Since the scanning procedure follows the conventional procedure, and the first subgroup scans from the beginning of the channels, as is conventional, no change need be made to any of the subscriber sets using the first subgroup, and the only change which must be made to the subscriber sets using the second subgroup is a change of the channel at which they begin the second scan.

BRIEF DESCRIPTION OF THE DRAWING

This invention is pointed out with particularity in the appended claims. The above and further advantages of this invention may be better understood by referring to the following description taken in conjunction with the accompanying drawings in which

DETAILED DESCRIPTION OF AN ILLUSTRATIVE EMBODIMENT

Figures 1, 1A:
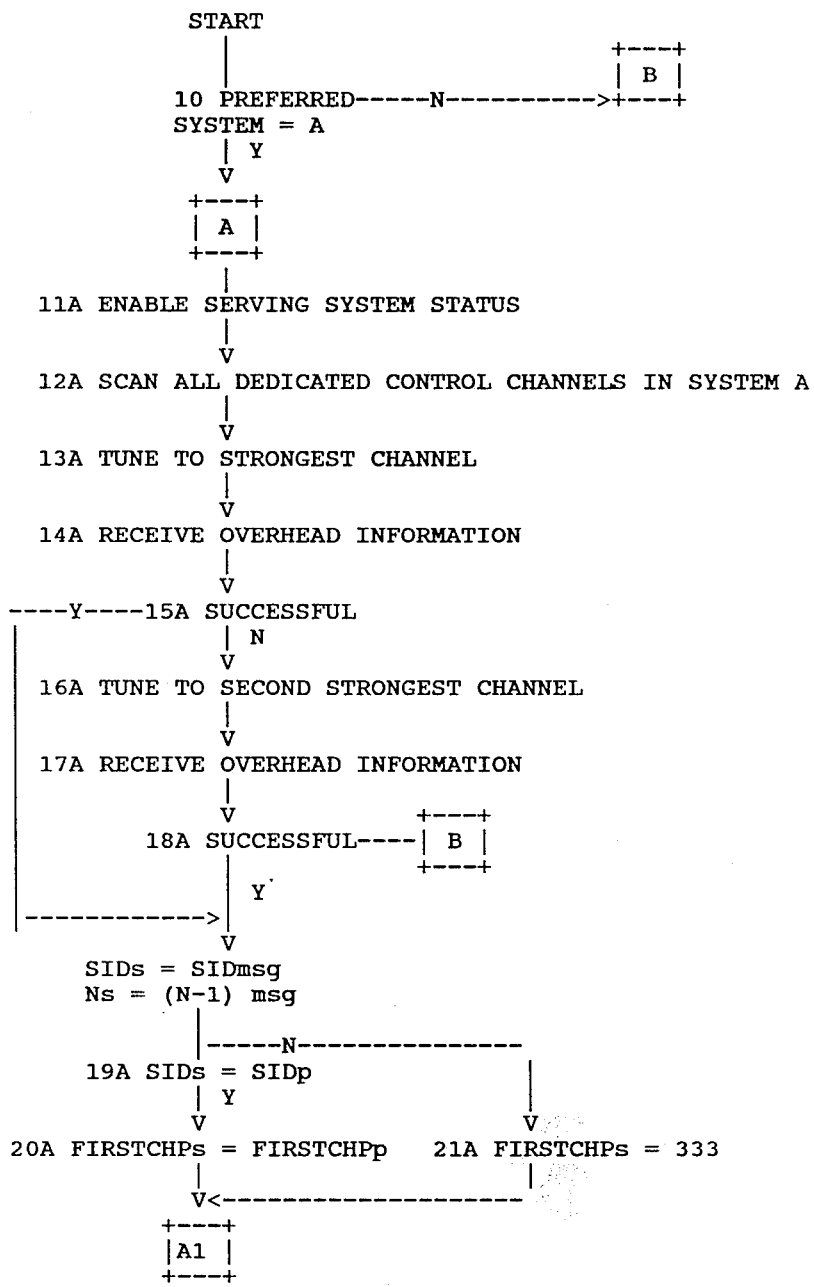
FIGS. 1A-1 through 1C-2 depict a flow diagram detailing the operations performed by subscriber sets in connection with scanning and selection of the control channels.

A cellular radiotelephone system provides telephone service using 666 channels in each of two frequency bands. One frequency band is used for down-link transmissions from a cell site to a subscriber, and the other frequency band is used for up-link transmissions from a subscriber to a cell site. Each channel in the down-link band has an associated channel in the up-link band, and the two unidirectional channels essentially operate as one bidirectional channel.

The channels are divided into two groups, namely a group A and a group B, whih can be used by competing service providers. Group A uses channels 1 through 333 and group B uses channels 334 through 666. Selected channels are used for transmitting access and paging control messages, and the remaining channels are used for voice transmission, as well as the transmission of control information applicable to a specific call. In group A, the paging and access control channels are channels 333 through 313, and in group B, the channels are channels 334 through 354. The access messages are transmitted by a subscriber to initiate a phone call to another subscriber, whether a cellular subscriber or a telephone subscriber on the conventional telephony network. Paging messages are transmitted by the cell site to indicate the presence of a telephone call for the cellular subscriber. In a message exchange following a paging message, or in response to an access message, the cellular telephone system assigns a voice channel to the subscriber which is used for voice transmission as well as transmission of control information applicable to that call.

In any particular cell, a subscriber set uses one paging control channel and one access control channel, which may be the same control channel. A subscriber set attempts to determine which control channel to use when it is initially turned on, periodically when it is not engaged in a call, when it passes from cell to cell (which is indicated when it is unable to receive messages from the first cell site) and when it has finished with a call. The procedure used by a subscriber set in selecting a control channel is depicted in the FIGS. In brief, the subscriber set perform a scan sequence including a first scan in which it identifies a control channel to be used as to obtain system information and a second scan in which it identifies a control channel to be used as an access channel. During the first channel scan, the subscriber set receives control messages which are normally sent by the cell site, which control access of subscriber sets to the cellular system. Such messages include control information that is used by the subscriber set during the second channel scan. A predetermined time after the second channel scan, that is, after the scan sequence, the subscriber set performs another scan sequence using control information received in messages received during the preceding scan. The subscriber set iteratively performs the scan sequence, and only stops when it is turned off or in a call.

With reference to FIG. 1A-1, the subscriber set first determines whether it is a subscriber of the service provider which provides service in cellular channel group A or group B (step 10) and proceeds to the sequence for the particular group. The sequence of steps that are performed are similar regardless of which group is used by the service provider, and similar steps are marked on the Figures with the same reference numerals but ending in "A" and "B".

Upon beginning the group-specific sequences, the subscriber set first performs some initialization operations (step 11). The set then begins the channel scan to obtain system information. If this is the first scan sequence, the subscriber set scans all of the dedicated control channels, that is, channels 333 through 313 in that order in group A, or channels 334 through 354 in group B (step 12). If this is the second or subsequent scan sequence, the first and last scanned channels are provided by calculations performed during the previous scan sequence. During the scan operation, the subscriber set notes the strength of the signal on each channel and tunes to the channel with the strongest signal (step 13).

The subscriber set then attempts to synchronize to a digital bit stream that is being transmitted over that channel. The digital bit stream represents a control message, which the subscriber set attempts to receive (step 14). If the message is not successfully received (step 15), the subscriber set tunes to the channel with the second strongest channel and performs the same operation (steps 16 and 17). If the subscriber set is unable to receive a message on either channel (step 18), it switches to the other channel group and performs the same operation.

A control message includes a number of fields, including an SID system identification field, an N number field which contains a value, a CPA combined paging-/access field which contains a flag, and a CMAX field, which also contains a value. The values contained in the N field and the CMAX field relate to the number of control channels. If the CPA combined paging/access flag is set, the paging and access channels are the same, otherwise they may differ. If, in steps 15 or 18 a control message is satisfactorily received, the subscriber set stores the values received in the SID system identification field and the N number field.

After the channel scan in steps 11 through 18, the subscriber set performs a second channel scan, as described below. Each subscriber set includes, stored in its control circuitry, a system identification number and a channel number at which the subscriber set starts the second scan. If the stored system identification number corresponds to the contents of the SID system identification field in the received message, the subscriber set begins the second scan at the channel number stored in its control circuitry; otherwise it begins the scan with the first channel, that is channel 333, if in group A, or channel 334, if in group B. In addition during the second channel scan, the number of channels that are scanned is related to the value in the N number field in the first message, and specifically is the value minus one.

With reference again to FIGS. 1A-1 and 1A-2, before the second scan the subscriber set first determines the first and last channels to scan during the second scan. If the subscriber set's system identification corresponds to the value in the SID system identification field in the message received during the first scan (step 19), the first channel to scan during the second scan is the paging channel number $FIRSTCHP_p$ that is stored in the subscriber set's control circuits (step 20). However, if the subscriber set's system identification and the SID system identification value do not correspond, the first channel to scan is the first channel in the group's control channel set, that is, channel 333 (group A) or 334 (group B) (step 21). The subscriber set's system identification and the SID system identification value do not correspond if the subscriber set is a roamer, that is, if it is not a subscriber to the cellular service provided by the cellular system's service provider.

Figures 1, 1A, 2:
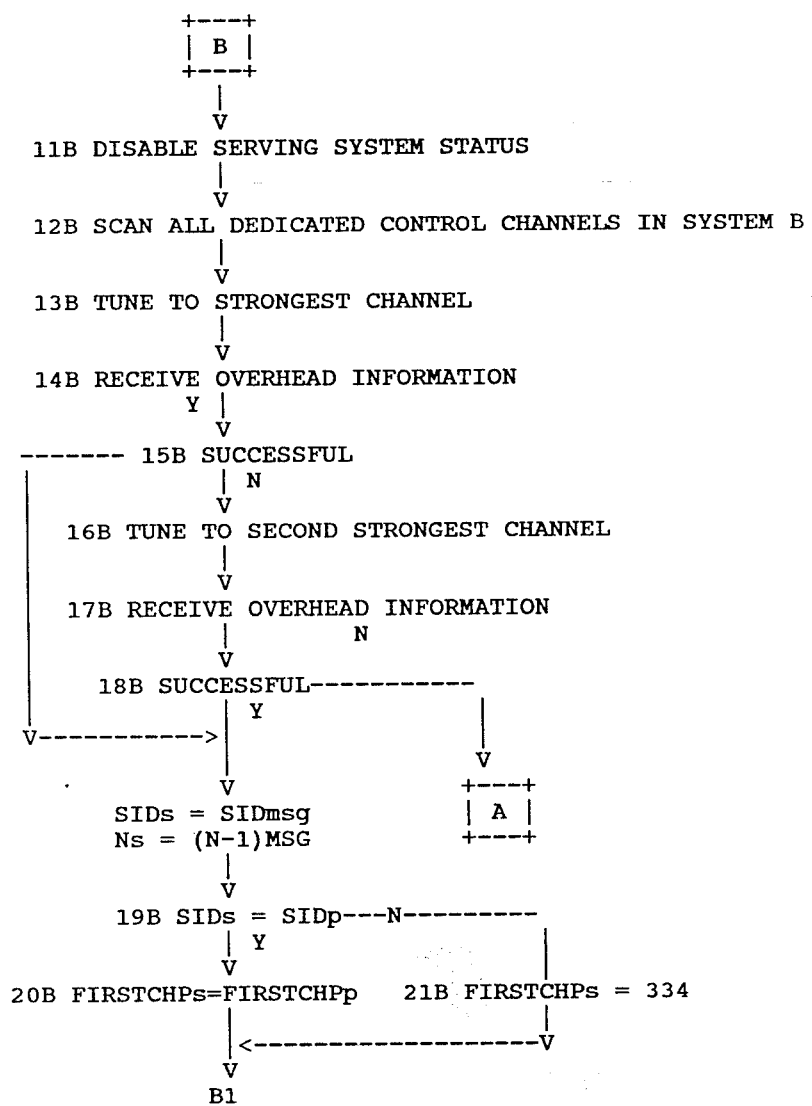
Figures 1, 1B, 2:
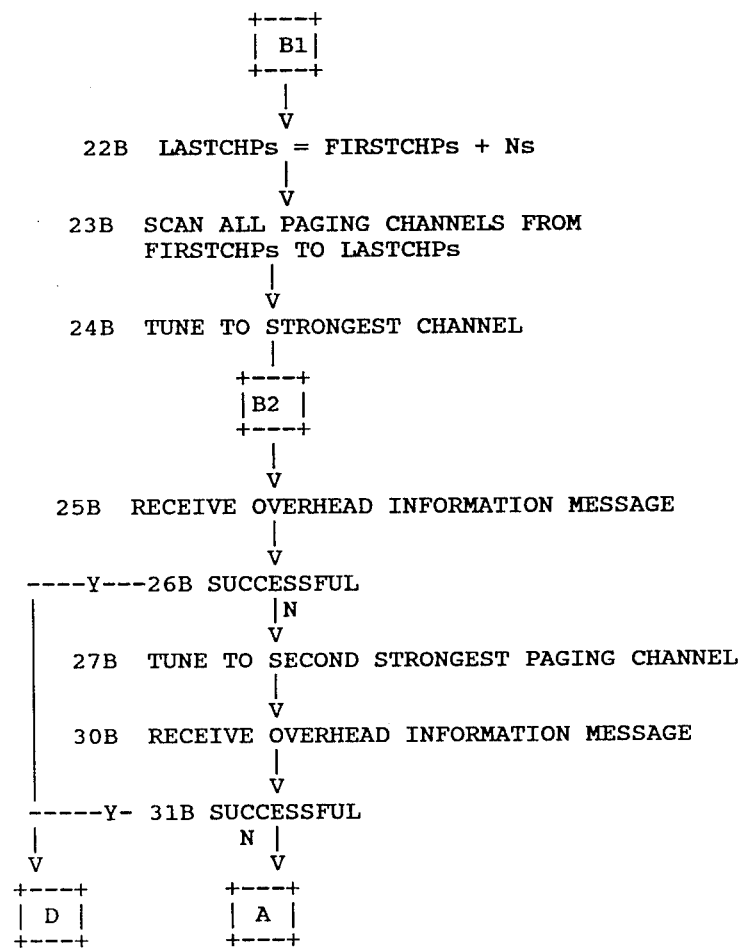

With reference to FIGS. 1B-1 and 1B-2, the subscriber set then calculates the channel number of the last channel to be scanned in the paging channel scan. This channel number corresponds to the number of the first channel to be scanned minus (in the case of group A) or plus (in the case of group B), one less than the number of channels to be scanned (step 22).

After the subscriber set has determined the first and last channels to be scanned, it performs a scan operation on the channels therebetween (step 23) to determine the strength of the signals of the scanned channels. The subscriber set then tunes to the strongest channel (step 24) and attempts to receive a message therefrom (step 25). If a message cannot be received (step 26), it tunes to the channel having the second strongest signal (step 27) and attempts to receive a message (step 30). If (step 31) the subscriber set is unable to receive a message in step 30, it returns to step 11 (FIG. 1A), using the opposite channel group; that is, from step 31A the subscriber set sequences to step 11B, and from step 31B the subscriber set sequences to step 11A.

Figures 1, 1C:
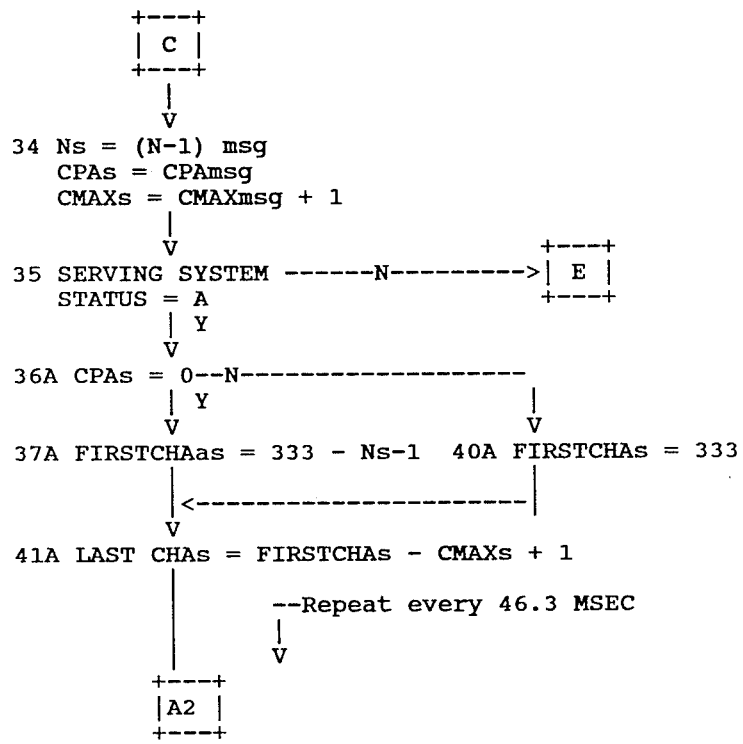
Figures 1, 1C, 2:
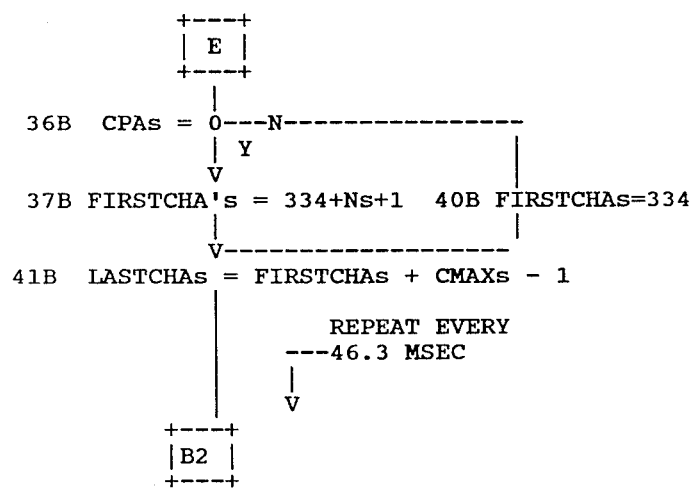

If the subscriber set successfully receives a message in step 26 or 31, it stores the contents of the SID system identification field (step 32) and compares them to the contents of the stored SID system identification field in the message received during the first scan (step 33). If they differ, the subscriber set returns to step 10 (FIG. 1A-1) to start over. Otherwise, the subscriber set stores the contents of the N number field, the state of the CPA combined paging/access flag, and increments by one the value in the CMAX field, which corresponds to the maximum number of control channels, and stores the result (step 34; FIG. 1C-1).

Following step 34 (FIG. 1C-1), the subscriber set sequences to step 35 and determines whether it is operating in group A or group B of the channels (step 35). In the next few steps, the subscriber set determines the first control channel which it uses in a subsequent first scan in an access scan sequence. If the saved CPA combined paging/access flag is clear (step 36), the control channel from which scanning begins is, for channel group A, channel 333 (the number of the first control channel for group A) minus the stored contents of the N number field of the just-received message, minus one, or, for channel group B, channel 334 (the number of the first control channel for group B) plus the stored contents of the N number field plus one (step 37). On the other hand, if the CPA combined paging/access flag is set (in step 36) the control channel from which scanning begins is channel 333 (for group A) or 334 (for group B) (step 40).

Following step 37 or 40, the subscriber set calculates the end point of the access scan operation in the next scan sequence, that is, the last control channel to be scanned, using the stored contents of the CMAX field of the previously received message. Those contents indicate the maximum number of control channels to be scanned. Accordingly, the subscriber set subtracts (if in group A) or adds (if in group B) the stored CMAX value from the value calculated in step 37, and increments (if in group A) or decrements (if in group B) the result by one (step 41). The result is the channel number of the last channel to be scanned during the next scan sequence.

In accordance with the invention, the particular channel group may be divided into two subgroups, one a primary subgroup and a secondary subgroup by:

(1) dividing the voice channels between the two subgroups, and (2) dividing the control channels into two subgroups, with the control channels allocated to the primary subgroup beginning at the first channel, that is, channel 333 (group A) or 334 (group B).

Access control messages are transmitted in at least one of the control channels in each of the two subgroups, with the access control messages in the primary subgroup control channels controlling access to the primary subgroup's voice channels. Similarly, the access control messages in the secondary subgroup control access to that subgroup's voice channels.

In addition:

(a) the control channel from which the subscriber set begins the paging channel scan be the firs channel, that is, channels 333 or 334, for the primary subgroup, and another channel for the secondary subgroup;

(b) control mesages transmitted in both subgroup control channels have the same system identification value in the SID system identification field;

(c) all control messages include the same value in the N field;

(d) control messages transmitted in the primary subgroup control channels include the same value in the CMAX field as is transmitted in the N field, and the CPA combined paging/access flag is set; and (e) control messages transmitted in the secondary subgroup control channels include, in the CMAX field, the number of paging and access control channels, and the CPA combined paging/access flag is cleared.

If these conditions are met, a group of cellular channels is divided into two subgroups. A an example, suppose group A is to be divided into two subgroups, with a subgroup A1 being the primary subgroup and subgroup A2 being the seondary subgroup. Control channels 333 through 320 are allocated to the primary subgroup A1, control channels 319 through 316 are allocated to the secondary subgroup A2, and control channels 315 through 313 are unused. In that condition, the control messages transmitted in control channels 333 through 320 include an N number field with the value 13, a CMAX field with the value 13, and a set CPA combined paging/access flag. The subscriber sets which use the primary subgroup A1 have the first paging channel in their control circuitry set for channel 333.

The control messages transmitted in control channels 319 through 316 include an N field with the value 13, a CMAX field with the value 3, corresponding to the number of control channels allocated to the A2 subgroup, and a cleared CPA combined paging/access flag. The subscriber set which use the primary subgroup A1 have the first paging channel in their control circuitry set for channel 319. Control channels 315 through 313 are unused and voice channels 312 through 306 are also cannot be used as explained below.

In this condition, a subscriber set which uses the primary subgroup A1, during the channel scan of the first scan sequence begins scanning at control channels 333 and scans through control channel 313, that is, the last control channel. During that scan, it will determine that one control channel either in the A1 primary subgroup or the A2 secondary subgroup has the greatest signal strength, tunes to that channel and attempts to receive a control message (steps 12–15, FIGS. 1A-1 and 1A-2). If it cannot receive a message, it tunes to the control channel having the second strongest signal and attempts to receive a control message (steps 16–18, FIGS. 1A-1 and 1A-2). In any event, if the subscriber set can receive a control message, it stores the contents of the SID system identification and N number fields.

During the scan in the second scan sequence, the subscriber set begins the scan at the channel set forth in its control circuitry, that is, channel 333 (step 20, FIGS. 1A-1 and 1A-2), and scans to channels 320 (that is 333 minus 13, the value of the contents of the N field in the message received during the access scan—see step 22, FIGS. 1B-1 and 1B-2). During that scan, the contents of the N number field (13) in the message are again stored, as are the contents of the CMAX field, incremented by one (that is, 14) and the set condition of the CPA combined paging/access flag. Thus, in step 40 (FIGS. 1C-1 and 1C-2) the first control channel scanned during the access scan in the next scan sequence is control channel 333. The last channel to be scanned during the second scan sequence is channel 320 (that is, 333−14+1, step 41). Accordingly, during the access scan for the second scan sequence, the subscriber set scans only channels 333 through 320, the same channels as scanned during the paging scan during the first scan sequence. It will be appreciated that during the scan sequences following the second scan sequence, the only channels scanned will be channels 333 through 320, that is, subgroup A1.

A subscriber set which uses the secondary subgroup A2 also begins the first scan sequence at control channel 333 and scans through control channel 313. During the second scan, it will begin scanning at the control channel identified in its control circuitry, that is, channel 319. Assuming that during the access scan it tunes to the same channel as the subscriber set which uses the A1 primary subgroup, and that it receives the same message, it will calculate the last channel to be scanned during the paging scan as 319 minus 13 (the value in the N field in the message received during the access scan, see step 22, FIGS. 1B-1 and 1B-2), or channel 306.

The subscriber set then performs the second scan on channels 319 through 306 and attempts to receive a control message. Since channels 315 through 313 are not being used, it will not receive a message in those channels. In addition, to avoid potential false signals, it is necessary that channels 312 through 306 not be used for voice transmission. Thus, the subscriber set may obtain a control message during the paging scan only in channels 319 through 316. On receiving that message, the subscriber set stores the contents of the N number field (which are 13), the CMAX field (3) and the cleared condition of the CPA combined paging/access flag.

After the subscriber set receives a control message during the second scan, it calculates the first channel and last channel which are scanned in the second scan sequence. Since the CPA combines paging/access flag is cleared, the subscriber set uses step 37 (FIGS. 1C-1 and 1C-1) to calculate the first channel, thus the first channel is 333 minus 13 (the value of the contents of the N field) minus 1, or 319. In addition, the subscriber set uses step 41 to calculate the last channel, thus the last channels is 319 minus 4 (the incremented value of the contents of the CMAX field) plus 1, or 316. Thus, during the second and subsequent scans, the subscriber set scans only channels 319 through 316. Since, after the access channel scan in the first scan sequence, the subscriber set scans either the A1 subgroup or the A2 subgroup, but not both, depending on the first paging channel stored in its control circuitry, the control channels may effectively be divided between the A1 and A2 subgroups. Control messages transmitted over the control channels in the two subgroups may separately permit the subscriber sets in the two subgroups to use the voice channels assigned to the particular subgroup.

If the subscriber set is a roamer, that is, if the contents of the SID system identification field of a received control message differ from the system identification of the subscriber set, then in all cases the subscriber set begins scanning from the first channel, that is, channel 333 (see steps 19 and 21, FIG. 1A and step 33, FIG. 1B). Accordingly, a roamer always uses the subgroup A1 control channels.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A cellular radiotelephone system including a cell site for transmitting to and receiving from a plurality of subscriber sets control messages and voice information in a plurality of channels including a contiguous set of control channels for carrying the control messages, each subscriber set iteratively scanning at least some of the contiguous control channels from a predetermined beginning channel for control messages and using control information received during each scan to determine the control channels to be scanned during the next scan, said control information including a value identifying the number of channels to be scanned, wherein the improvement comprises providing a first group of subscriber sets with control circuitry that begins scanning at the beginning channel and a second group of subscriber sets with control circuitry that begins scanning at a second control channel displaced from said beginning channel by at least as many control channels as the number to be scanned, so that one group of subscriber sets scans control channels from the beginning and another group of subscriber sets scans other control channels from said second control channel.

* * * * *